US008184646B2

(12) United States Patent
Chen et al.

(10) Patent No.: US 8,184,646 B2
(45) Date of Patent: May 22, 2012

(54) TELECOMMUNICATIONS SYSTEM AND METHOD

(75) Inventors: Xiaobao Chen, Wiltshire (GB); Philippe Lucas, Bievres (FR)

(73) Assignee: Orange SA, Paris (FR)

( * ) Notice: Subject to any disclaimer, the term of this patent is extended or adjusted under 35 U.S.C. 154(b) by 567 days.

(21) Appl. No.: 12/224,909

(22) PCT Filed: Mar. 19, 2007

(86) PCT No.: PCT/GB2007/000969
§ 371 (c)(1),
(2), (4) Date: Jan. 27, 2009

(87) PCT Pub. No.: WO2007/110584
PCT Pub. Date: Oct. 4, 2007

(65) Prior Publication Data
US 2010/0067449 A1     Mar. 18, 2010

(30) Foreign Application Priority Data

Mar. 24, 2006  (EP) .................................. 06290516.1

(51) Int. Cl.
*H04L 12/28* (2006.01)
*H04L 12/56* (2006.01)
*H04L 12/66* (2006.01)
*H04W 4/00* (2009.01)
(52) U.S. Cl. .................... 370/401; 370/329; 370/354
(58) Field of Classification Search .................. 370/329, 370/352–356, 401
See application file for complete search history.

(56) References Cited

U.S. PATENT DOCUMENTS

| 6,728,208 | B1 | 4/2004 | Puuskari | 370/230.1 |
| 6,985,446 | B1 * | 1/2006 | Hurtta et al. | 370/249 |
| 7,023,820 | B2 * | 4/2006 | Chaskar | 370/329 |
| 7,260,074 | B2 * | 8/2007 | Vare | 370/331 |
| 2003/0227871 | A1 * | 12/2003 | Hsu et al. | 370/230 |
| 2005/0239465 | A1 * | 10/2005 | Lee et al. | 455/436 |
| 2006/0002333 | A1 * | 1/2006 | Skog et al. | 370/328 |

FOREIGN PATENT DOCUMENTS

WO    WO 02/30056 A2    1/2002

* cited by examiner

*Primary Examiner* — Ronald Abelson
(74) *Attorney, Agent, or Firm* — Haverstock & Owens LLP

(57) ABSTRACT

A telecommunications system includes a packet radio network comprising a core network and a radio network that communicate internet packets in accordance with a configuration of the core network and the radio network. The mobile node establishes a communications bearer for communicating across the mobile radio network, to generate a packet data connection activation request, including a service level identifier representing a priority of the mobile node and to communicate the packet data connection request to the core network. The core network establishes a communications bearer with the mobile node in accordance with the packet data connection request and to adapts the routing configuration and communications resources following a change of location of the mobile node with a priority determined by the service level identifier. Through inclusion of the service level identifier in the packet data connection request, relative priority is given to mobile nodes requiring higher priority data transmission.

22 Claims, 16 Drawing Sheets

Taken from 3GPP 24.008

TELECOMMUNICATIONS SYSTEM AND METHOD

FIELD OF THE INVENTION

The present invention relates to telecommunications systems and methods, which are operable to provide a facility for mobile communications to mobile nodes, using a packet radio network comprising a radio network and a core network, in which a communications bearer for communicating the internet packets to and from the mobile node is established using a packet connection procedure.

BACKGROUND OF THE INVENTION

In packet radio networks such as, for example, the General Packet Radio Service (GPRS), mobile nodes are provided with a facility for communicating packet data via a radio interface and a core network. The packet radio networks are arranged to allow the mobile nodes to move within a coverage area provided by the radio network whilst supporting communication sessions.

In some scenarios, the packet radio network will be required to deal with a high volume of requests from mobile nodes for various network services, such as at peak usage times or in parts of the packet radio network covering busy areas such as city centres. The requests from the mobile nodes resulting for example from mobility or hand-over requests can affect both the radio network and the core network of the mobile radio network. These network services may be related to signalling such as routing update messages, they may relate to actual voice and/or data sessions such as telephony, web browsing or email, or they may be associated with a configuration of the packet radio network or allocation of communications resources, which is required to support mobility, such as handovers between base stations. When the packet radio network is required to deal with such a high volume of requests, it is possible that communication of data packets via the packet radio network will experience increased delays or interruptions, because limited communications resources are being allocated to the communication of a higher volume of data packets from other mobile nodes. Such increased delays or interruptions in the communication of data packets can cause a reduction in service quality particularly for mobile nodes which are engaged in supporting services requiring real time, or near real time quality of service such as, for example voice services or video conferencing. It is therefore desirable to alleviate or at least reduce such delays or interruptions in the communication of data packets across packet radio networks in order to reduce a likelihood of affecting the service quality provided to mobile nodes, particularly for those engaged in supporting services requiring real-time or near real time quality of service.

SUMMARY OF THE INVENTION

According to an aspect of the present invention a telecommunications system is operable to provide a facility for mobile communications to a mobile node, the system comprising a packet radio network comprising a core network and a radio network. The core network is arranged to communicate internet packets to and from the radio network in accordance with a location of the mobile node within the packet radio network, and the radio network is arranged to communicate internet packets received from and sent to the core network to and from the mobile node via a radio access interface. The radio network is arranged to communicate the internet packets received via the core network to and from the mobile node via a radio access interface. The core network and the radio network are arranged to communicate the internet packets in accordance with a configuration of routing or communications resources of at least one of the radio network or the core network part established in accordance with the location of the mobile node. The mobile node is operable in accordance with a packet connection procedure for establishing a communications bearer for communicating the internet packets across the packet radio network, to generate a packet data connection activation request. The packet data connection activation request is adapted to include a service level identifier representing a priority to be afforded to communicating internet packets to or from the mobile node with respect to the internet packets received from other mobile nodes. The mobile node is operable to communicate the packet data connection request to the core network of the packet radio network. The core network is operable to establish a communications bearer to and from the mobile node via the core network and the radio network, in accordance with the packet data connection request. The core network is operable to adapt the routing and communications resources of the core network and the radio network following a change of location of the mobile node with a relative priority determined in accordance with the service level identifier.

Adapting the packet data connection activation request to include a service level identifier allows the processing of packet data connections to be prioritized. The adaptation of the packet data connection activation request to include the service level identifier also allows the core network to prioritize the processing of the configuration of routing or communications resources within the core network and radio network and thus allocate network resources to mobile nodes based on a requested level of service. The telecommunications system is therefore able to optimize the use of communications resources, so that mobile nodes engaged in applications requiring a higher priority data transmission are less likely to experience an interruption or delay either establishing a communications bearer or requiring services related to configuring of routing or communications resources, as the establishment of such communication bearers or processing of such resources will be prioritized. Therefore for example, mobile nodes engaged in supporting real time services can be afforded a higher priority than non-real time or best effort quality of service such as, for example, email, which are less adversely affected by delays or interruptions in the communication of internet packets.

To alleviate the problem of delays and interruptions in data transmission experienced by users of mobile nodes requiring real time or near real time data transmission, the mobile node adapts a packet data activation request to include a service level identifier. The service level identifier represents a priority to be afforded to the internet packets communicated to and from the mobile node with respect to internet packets received from other mobile nodes operating in the radio packet network. The core network is also operable to adapt the configuration of routing and communications resources in the core network and the radio network in accordance with the service level identifier. Thus internet packets communicated to and from a mobile node, and configuration of routing and communications resources affecting the mobile node, can be prioritized by the core network. This can allow for improved use of network resources as users of mobile nodes requiring real time or near real time data transmission can be treated with a higher priority.

In one embodiment, the core network part is operable to process a routing area update request from the mobile node in accordance with the requested priority represented by the service level identifier. In this way, mobile nodes running applications requiring a higher priority data transmission, which have moved from one routing area to another, will be prioritized ahead of lower priority data transmission and so that higher priority services are less likely to experience a decrease in service quality.

In some embodiments, the core network part is operable to process a hand over procedure in which the mobile node changes affiliation from a first of a plurality of radio communications nodes in the radio network to a second of the radio communications nodes of the radio network. As such the core network is operable to process a procedure for changing the affiliation of the mobile node between the first radio communications node and the second radio communications node in accordance with the requested priority represented by the service level identifier. By changing affiliation in accordance with the requested priority, mobile nodes running applications requiring a higher priority data transmission which have changed affiliation, will experience a reduction in the likelihood of a decrease in service quality, because the processing of such procedures for changing affiliation is prioritized, whereas changes of affiliation for mobile nodes running applications, which are less sensitive to delays and interruptions, requiring a lower priority data transmission will be performed according to a lower priority.

Further aspects and features of the present invention are included in the appended claims.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF EXAMPLE EMBODIMENTS

Figure 1:
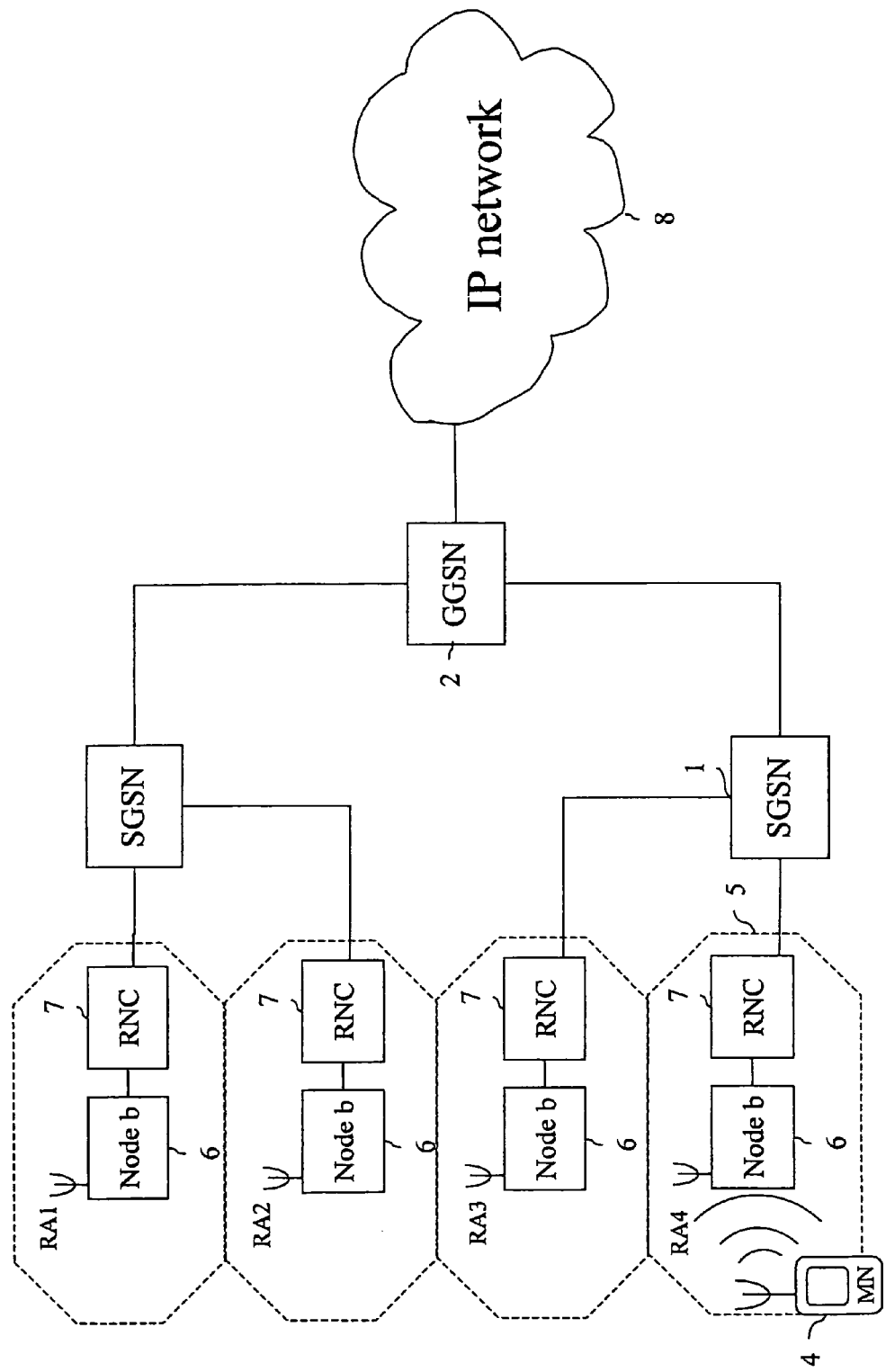
FIG. 1 provides a schematic block diagram of a simplified GPRS/UMTS packet radio network.

An explanation of example embodiments of the invention will now be explained with reference to a General Packet Radio System (GPRS) systems. FIG. 1 provides a schematic block diagram of a GPRS/UMTS packet radio network for communicating internet packets to and from a mobile node (MN) 4. In FIG. 1 the mobile node 4 is arranged to engage in a packet data communication session, for example web browsing or email. FIG. 1 shows elements of a GPRS network including a GPRS gateway service node (GGSN) 2 a serving GRPS support node (SGSN) 1 a radio network controller (RNC) 7 and a node b 6. Generally, the GGSN 2 and the SGSN 1 form part of a core network, CN, whereas the radio network controller RNC 7 and node b 6 form part of a radio network RN.

Figure 2:
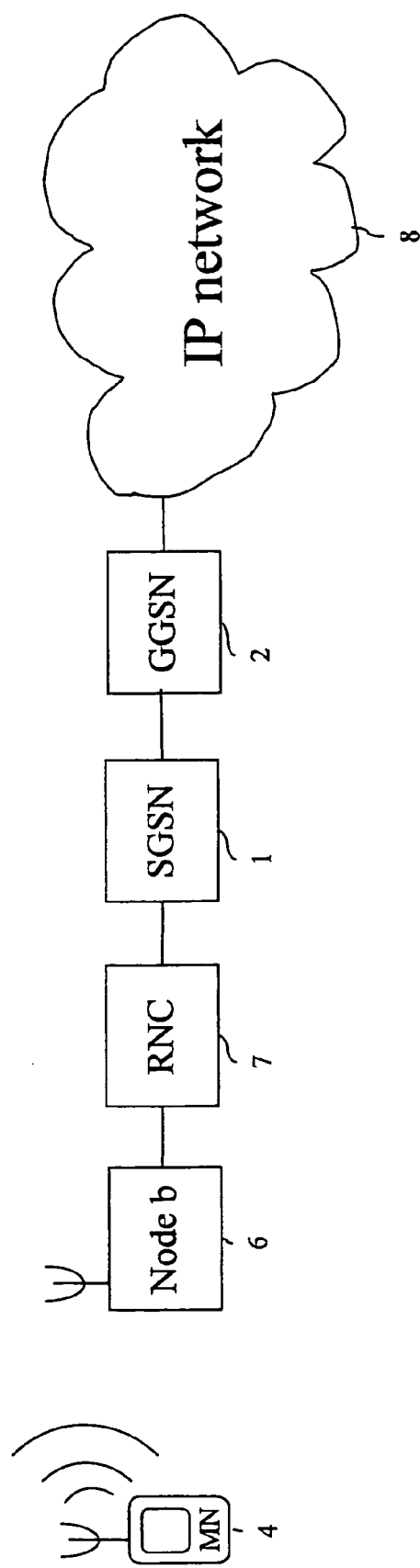
FIG. 2 provides a diagram showing a simplified GPRS/UMTS packet radio network.

FIG. 2 provides a schematic block diagram of the flow of data packets communicated to and from the mobile node 4 via a radio communication link between the mobile node 4 and the Node B 6 and RNC 7. Internet packets are then communicated via the SGSN 1 and GGSN 2. If packets are to be communicated to and from an external IP network 8, the GGSN 2 provides a link out of the GPRS/UMTS packet radio network.

Figure 3:
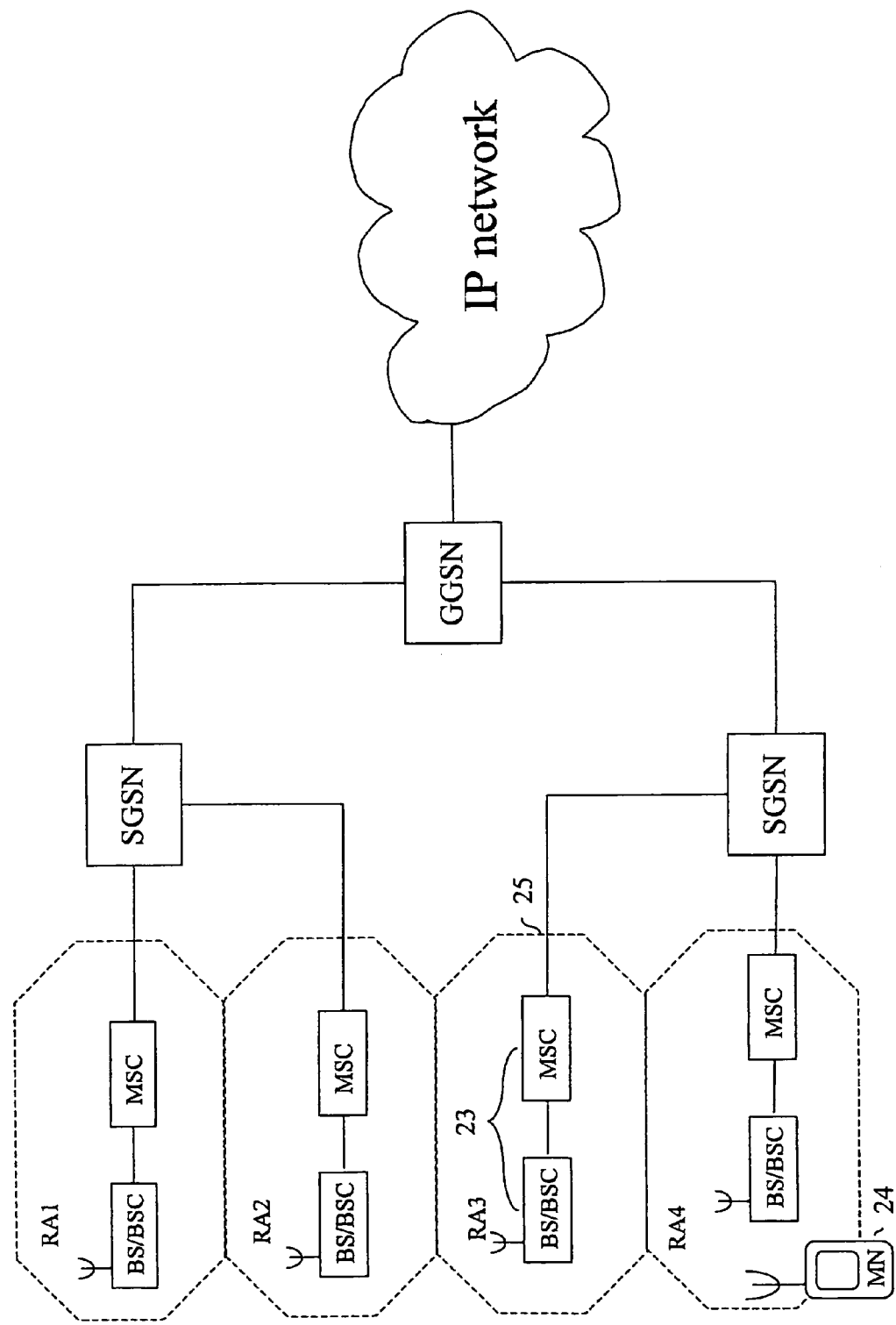
FIG. 3 provides a schematic block diagram of a simplified representation of a packet radio network operating in accordance with the GPRS/GSM standard.

As will be shown later, embodiments are not restricted to GPRS/UMTS packet radio systems. For example FIG. 3 provides a schematic block diagram of a GPRS/GSM packet radio network for communicating interne packets to and from a mobile node 24. As for the GPRS/UMTS packet radio network, the GGSN and the SGSN form part of a core network, but unlike the GPRS/UMTS packet radio system the radio network is formed by the base station/base station controller (BS/BSC) or Node B and RNC.

In accordance with the known GPRS standard in order for a mobile node to establish a communications bearer for communicating internet packets via the GPRS network, a packet data protocol context procedure is used by the mobile node. This will now be explained.

PDP Context

Figure 4:
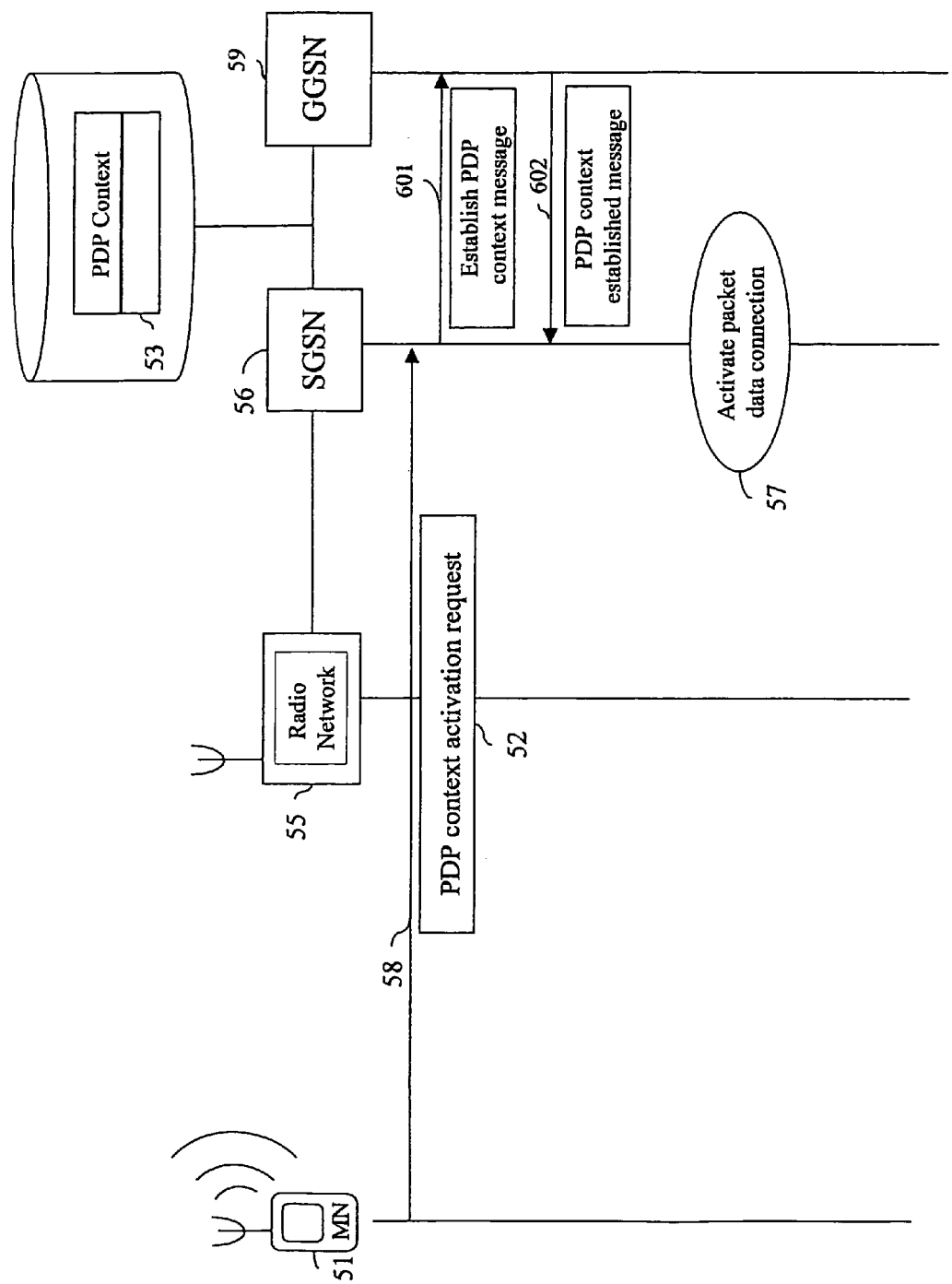
FIG. 4 provides a diagram showing a PDP context activation request message being sent from a mobile node to a core network.

FIG. 4 provides an illustration of example through which a packet data connection is established in a GPRS/UMTS packet radio network. In a GPRS/UMTS packet radio network, a packet data connection between the mobile node and the core network is managed by a communication bearer profile held in the core network. This is known as a Packet Data Protocol (PDP) context. The PDP context contains information required for managing the communication as the information includes routing data, an address of a network node allowing access to external packet networks and an IP address allocated to the mobile node upon request of the PDP context. A mobile node can only establish a packet data connection when a PDP context has been activated. As shown in FIG. 4, to initiate a communication session, the mobile node 51 sends a PDP context request message 52 to an SGSN 56 requesting the setting up of a PDP context 53. If the SGSN 56 accepts this request, the SGSN 56 sends a Establish PDP context message to a GGSN 59. The GGSN 59 performs a number of tasks required for setting up the PDP context, for example establishing the IP address allocated to the mobile node. When the GGSN 59 has completed all the tasks required for setting up the PDP context it sends a PDP context established message 602 to the SGSN. The PDP context 53 is then activated and a packet data connection is established 57.

Service Level Identifier

Figure 5:
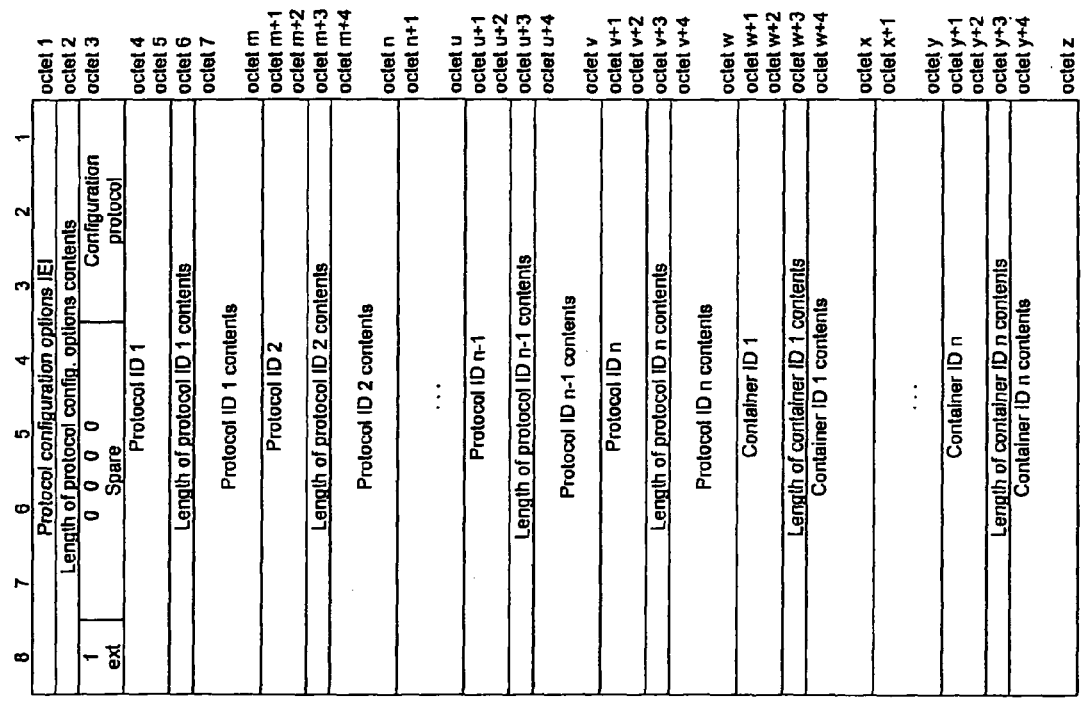
FIG. 5 provides a diagram showing the format of the Packet Configuration Option information element.
Figure 6:
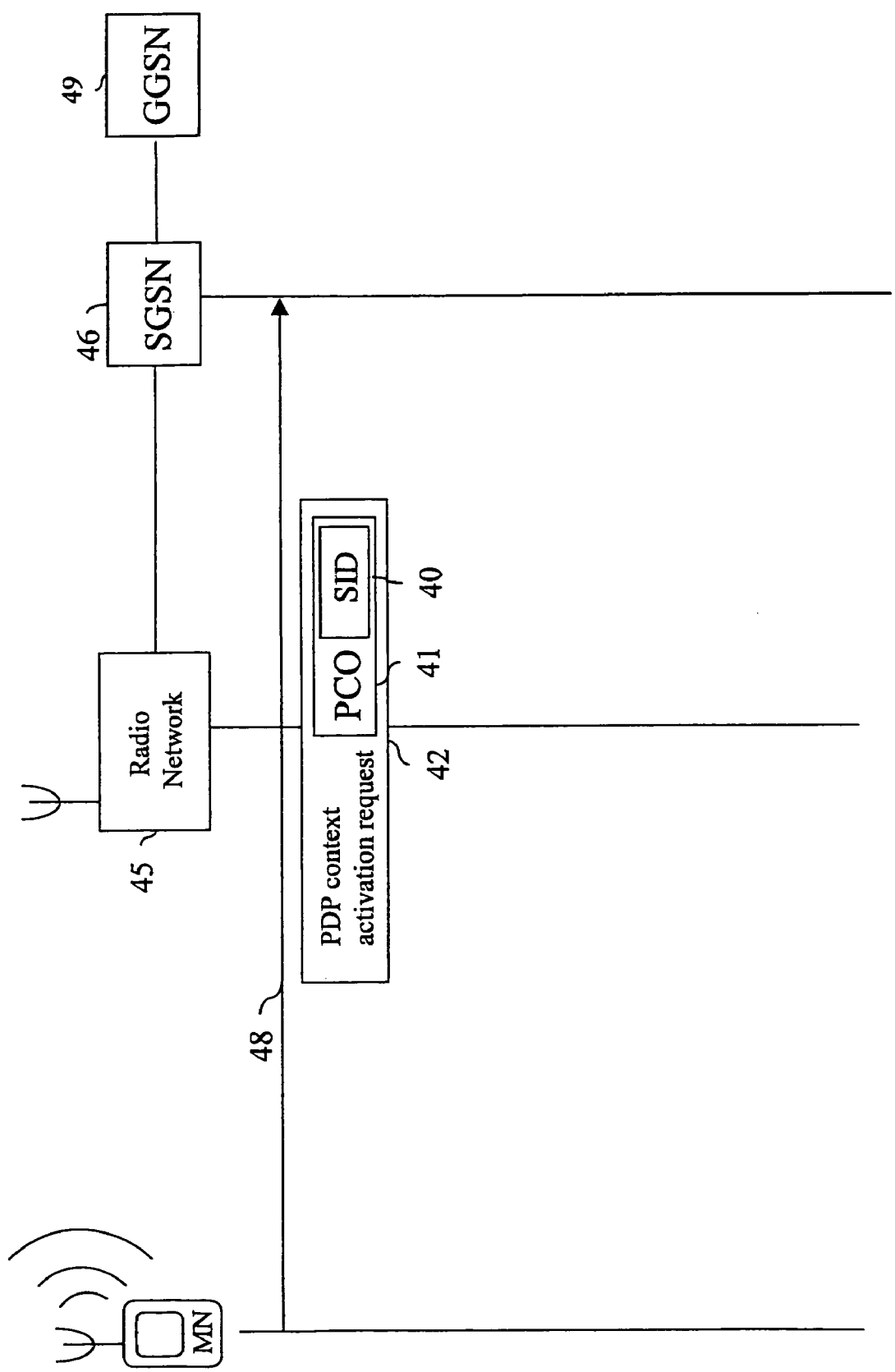
FIG. 6 provides a diagram showing a PDP context activation request message adapted to include a service level identifier (SID) being sent from a mobile node to a core network.

As shown in FIG. 6, to reduce delays and interruptions in data transmission experienced by users of mobile nodes requiring real time or near real time data transmission, the mobile node adapts a PDP context activation request 42 to include a Service level Identifier (service level identifier) 40. The service level identifier 40 represents a priority to be afforded to the control and management of mobility and handover. For example, this might include location updates, routing updates and resource allocation and bearer setup for the communication of internet packets to and from the mobile node with respect to internet packets received from other mobile nodes operating in the GPRS/UMTS packet radio network. The SGSN 46 in combination with the GGSN 49 is operable to adapt the current configuration of routing and communication resources of the core network and the radio network 45 in accordance with the service level identifier 40. Thus internet packets communicated to and from a mobile node, and routing and resource allocation affecting the mobile node, can be prioritized by the core network 46. This prioritisation will allow for improved use of network resources for example for users of mobile nodes requiring real time or near real time data transmission which, can then be treated with a higher priority. As shown in FIG. 6, the mobile node inserts the service level identifier 40 in unused bits in the Protocol Configuration Option (PCO) information element 40 of the PDP context request message 42. Shown in FIG. 5 is the Packet Configuration Option Information Element (PCO) is an information element included in a PDP context request message. It is defined in 3GPP Technical specification 24.008 (10.5.63). As shown in FIG. 5, the PCO includes four undefined bits in the third octet. By defining these spare bits as service level identifier bits 40, the mobile node can use them to represent a requested priority. Alternatively, the Protocol ID/Protocol ID content part can be used to carry the service level identifier.

Upon receipt of the PDP context activation request message 42 from the mobile node, the SGSN 46 can inspect the service level identifier bits 40 of the PCO 41 and determine the requested level of priority from the mobile node.

Service Level Identifier Cache

Figure 7:
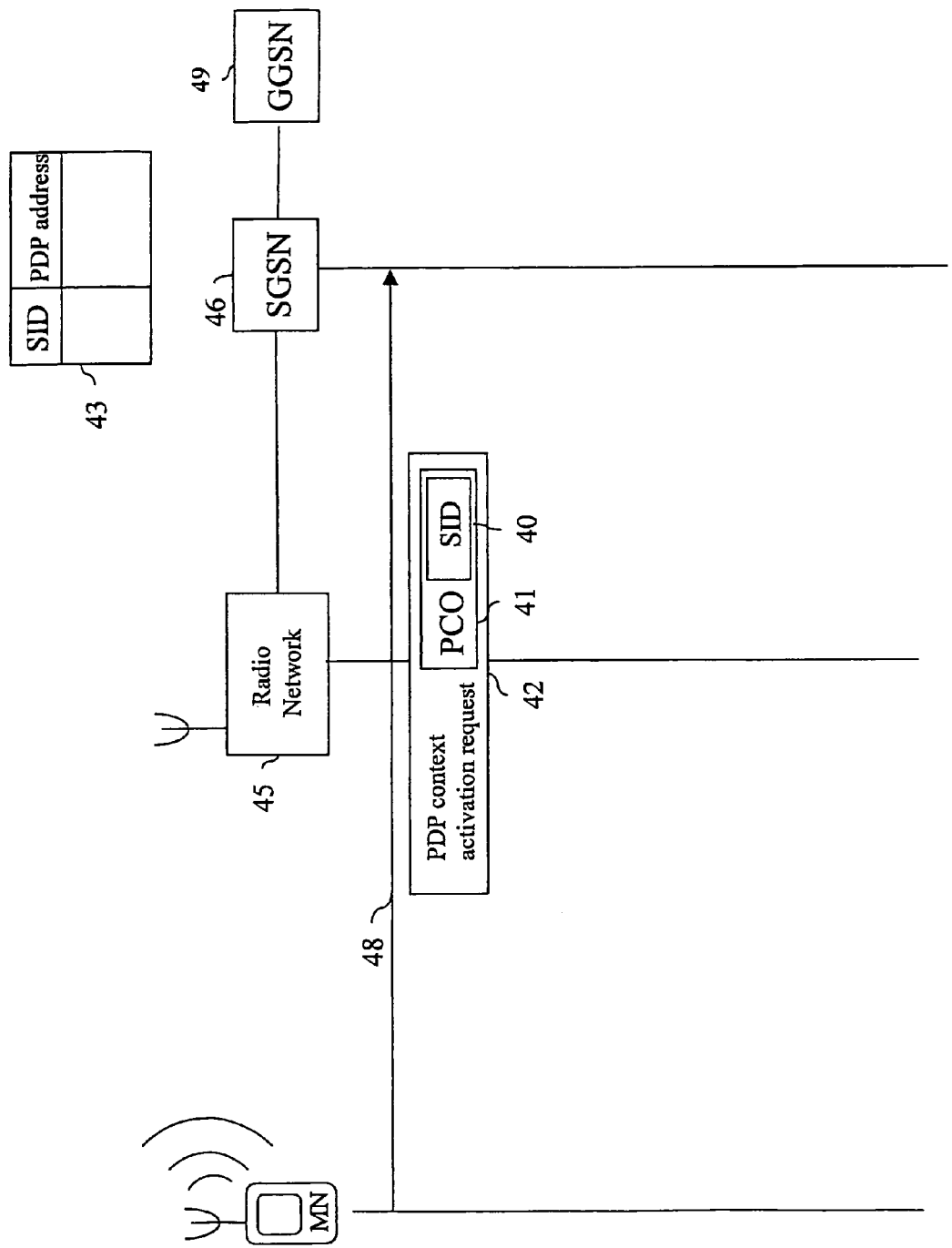
FIG. 7 provides a diagram showing a PDP context activation request message adapted to include a service level identifier being sent from a mobile node to a core network including a service level identifier cache.

As shown in FIG. 7, the core network maintains a service level identifier cache 43. Upon receipt of the PDP context activation message 42, the SGSN 46 inspects service level identifier 40 and stores it in the service level identifier cache 43 in association with a PDP address allocated to the mobile node.

Figure 8:
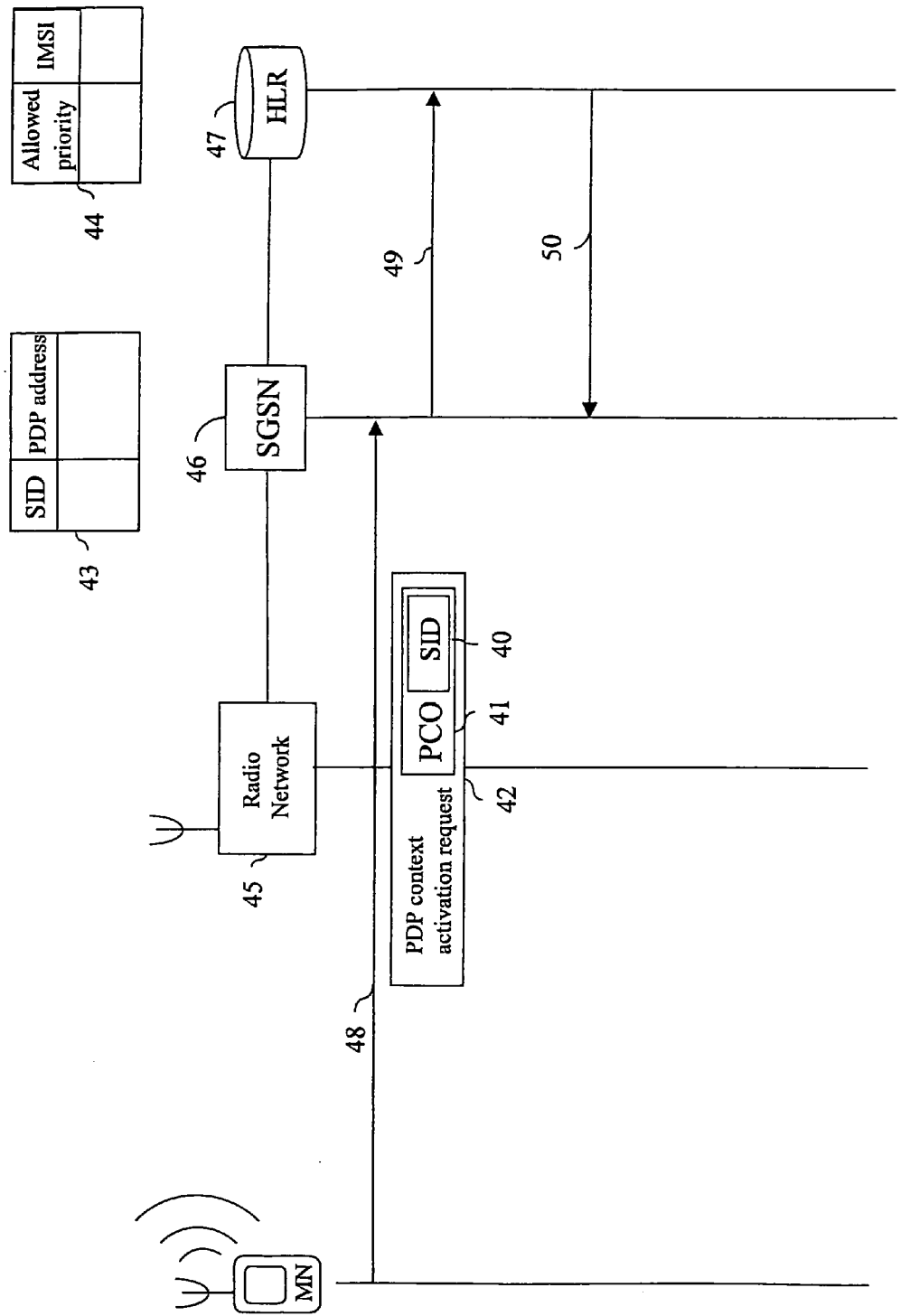
FIG. 8 provides a diagram showing a PDP context activation request message adapted to include a service level identifier being sent from a mobile node to a core network including a service level identifier cache and an HLR.

As shown in FIG. 8 the SGSN may be operable to compare the service level identifier 40 representing a requested priority with a permitted service level stored in a profile associated with an identifier of the mobile node, such as an International Mobile Subscriber Identification (IMSI) 44, associated with the mobile node. This stored profile may be held in a home location register (HLR) 47 and indicate a priority to which the mobile node is subscribed and therefore permitted to be afforded. If the requested priority is not a higher priority than is allowed, the core network affords the requested priority to the mobile node. The comparison is made by the SGSN in the core network. To this end data, 49 representing the service level identifier 40 is sent to the HLR 47. The HLR 47 then sends a response 50 back to the SGSN 46 confirming the priority which can be afforded the mobile node.

Routing Area Update

Figure 9:
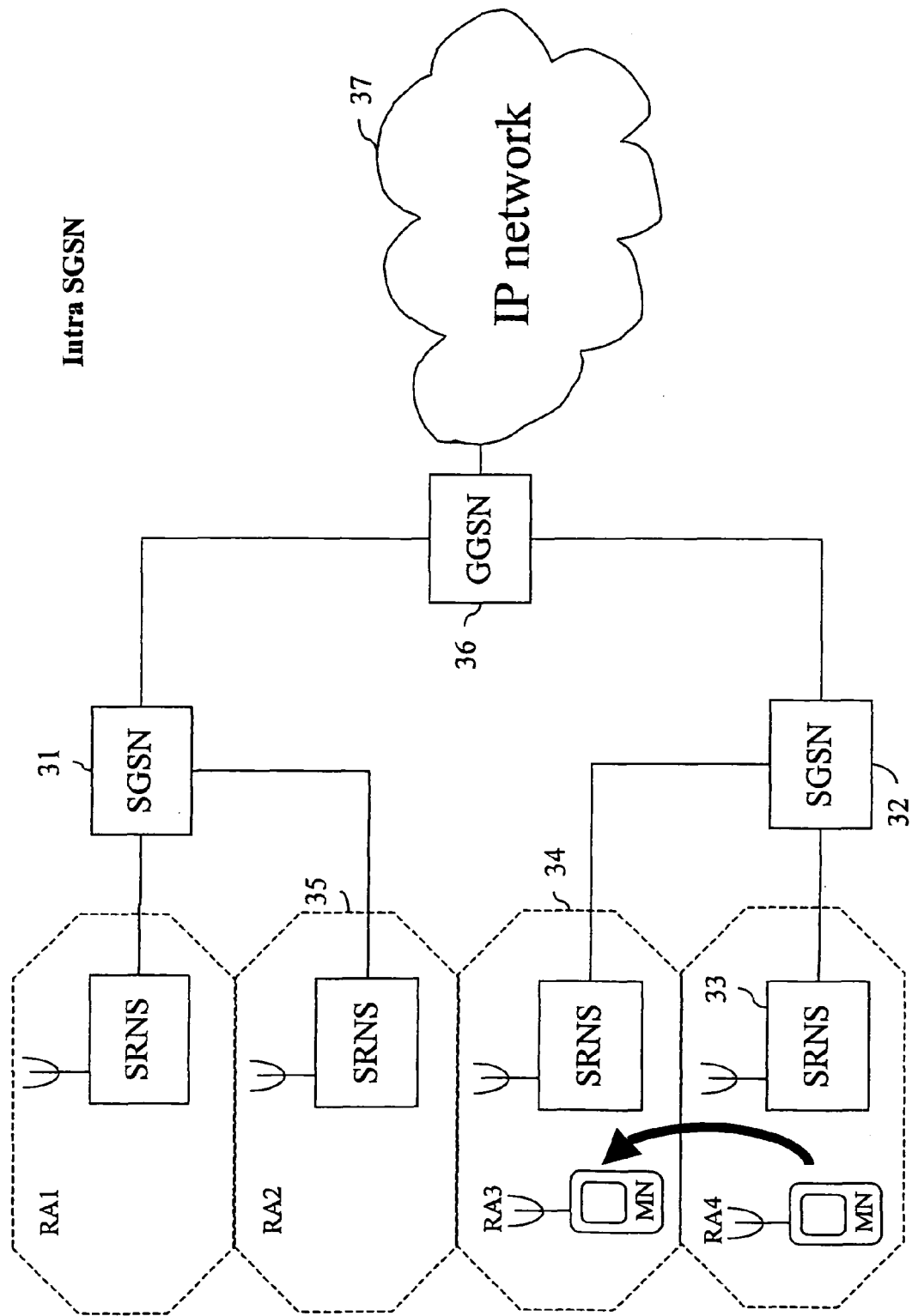
FIG. 9 provides a schematic block diagram showing a mobile node undergoing an intra SGSN routing area change.
Figure 10:
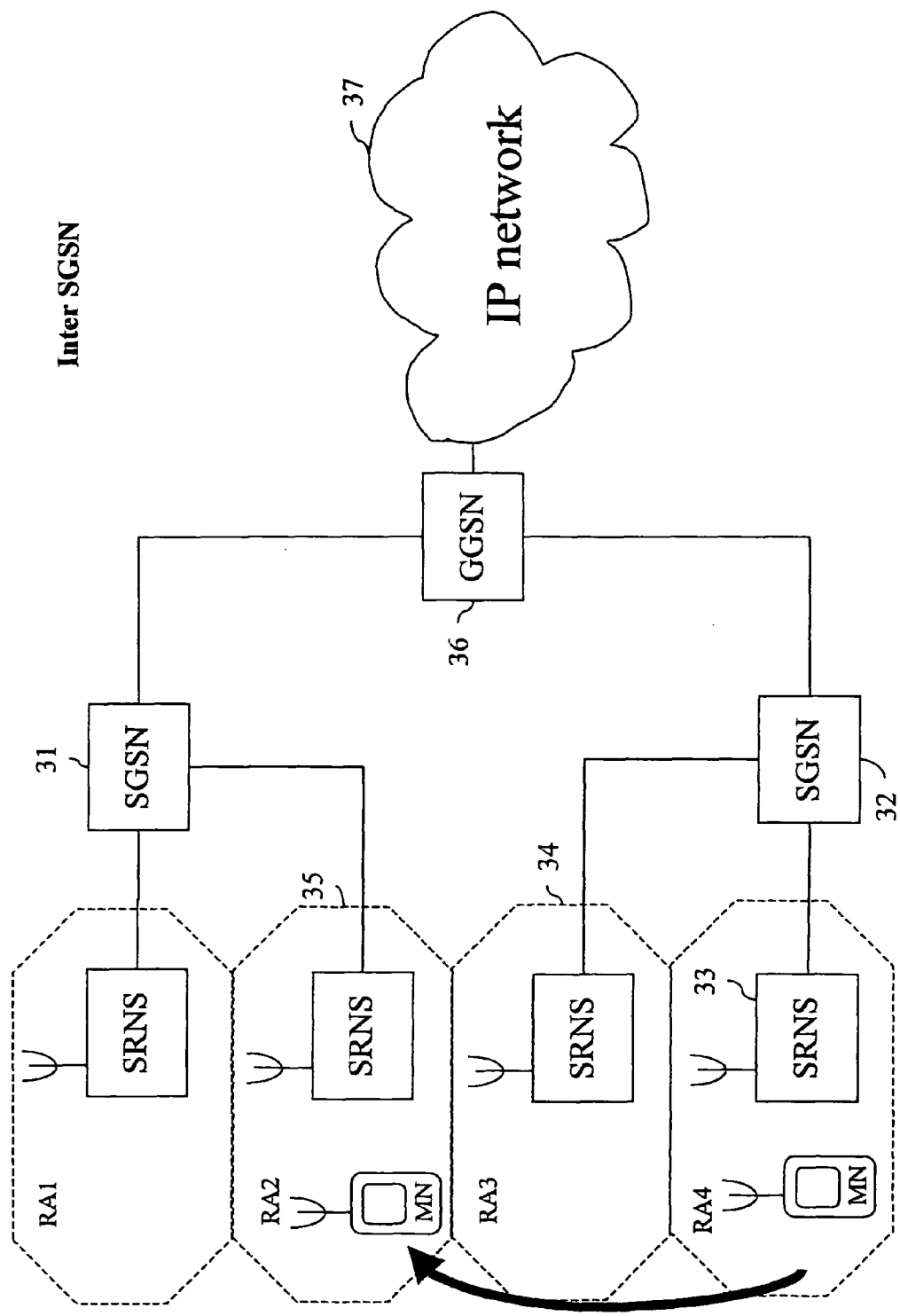
FIG. 10 provides a schematic block diagram showing a mobile node undergoing an inter SGSN routing area change.

Returning to FIG. 1, the radio network is divided into a number of routing areas: routing area 1 (RA1), routing area 2 (RA2), routing area 3 (RA3) and routing area 4 (RA4). As shown in FIG. 1, an SGSN 1 may control a number of routing areas routing area 3, routing area 4. The GPRS/UMTS packet radio network is divided into different routing areas, to separate the packet radio network into logical areas for the purposes of routing and mobile node mobility support. When a mobile node moves from one routing area to another routing area, it sends a routing area update message to the core network. The mobile node is also required to periodically send a routing area update to the core network, irrespective of whether it has moved. There are two types of routing area updates prompted when a mobile node moves from one routing area to another, an intra SGSN routing area update, and an inter SGSN routing area update. FIG. 9 shows the case of an intra SGSN routing area update. The mobile node moves from a routing area controlled by an SGSN 32, routing area 4, to another routing area, routing area 3, controlled by the same SGSN 32. FIG. 10 shows the case of an inter SGSN routing area update. The mobile node moves from a routing area, routing area 4, controlled by one SGSN 32 to a routing area, routing area 2, controlled by a second SGSN 31. In both cases the processing of routing area updates consumes network resources such as bandwidth and processing time. As shown in FIG. 9, intra SGSN routing area updates can be performed solely with the relevant SGSN 32. However an inter SGSN routing area update, shown in FIG. 10, consumes further network resources because it involves processing by both SGSNs 31, 32 and the GGSN 36 and the updating of the mobile node's PDP context. At times when the core network is supporting a high number of data connections, the speed with which routing area updates be processed may decline. This may result in mobile nodes engaged in active packet data connections encountering delays and interruptions in communication of internet packets.

Figure 11:
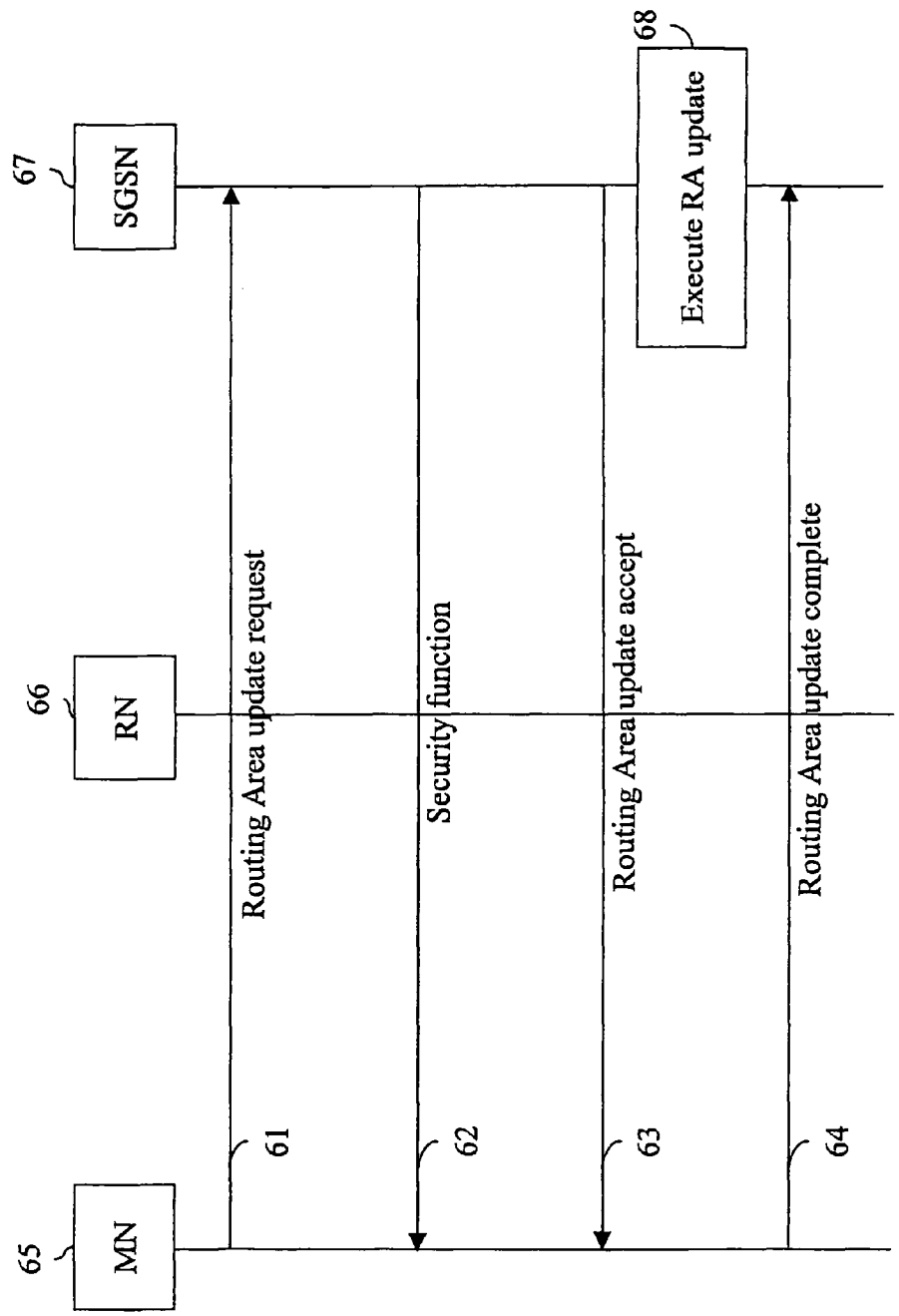
FIG. 11 provides a diagram showing the process by which an intra SGSN routing area update is executed.

In one embodiment, the core network affords the mobile node a level of priority for handling a routing area update in accordance with the service level identifier. Therefore, in a scenario in which there are many mobile nodes crossing between routing areas, for example a busy cell or moving transportation system such as a train, the core network can determine which mobile nodes are engaged in communication sessions requiring real time or near real time data transmission, and prioritize the handling of routing area updates on that basis. This may be effected in either the SGSN or the GGSN Intra SGSN Routing Area Update FIG. 11 shows a procedure for an intra SGSN routing area update used in a GPRS/GSM packet radio network. The mobile node 65 sends a routing area update request 61 to the SGSN 67. The SGSN 67 may then initiate some security functions 62 to validate the request. The SGSN 67 then sends a routing area update accept message 63 to the mobile node 65. The SGSN 67 then performs the routing area update 68. The mobile node 65 acknowledges the routing area update accept message 63 by sending a routing area complete message 64 to the SGSN 67. These messages are all communicated via the radio network 66.

Figure 12:
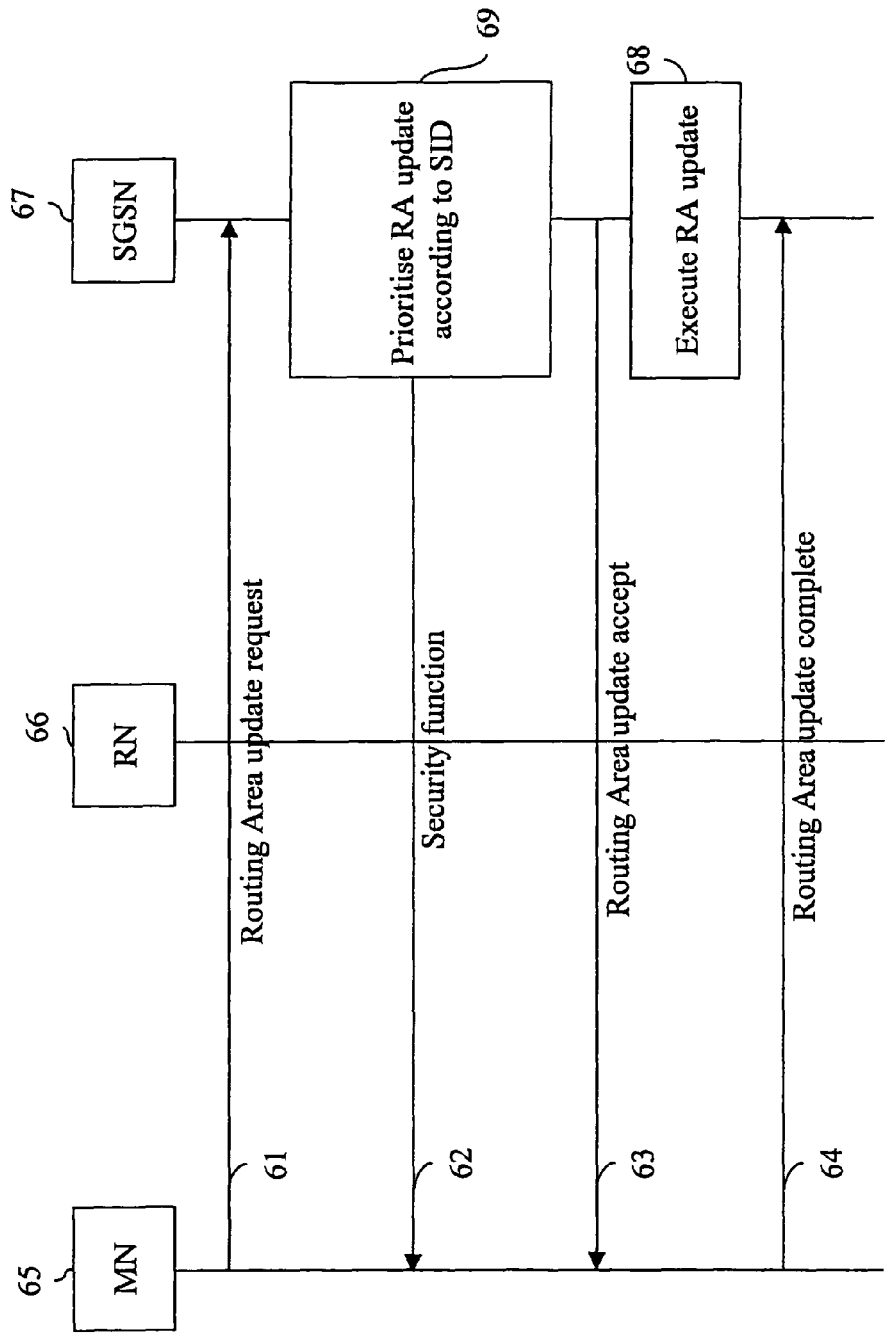
FIG. 12 provides a diagram showing the process by which a service level identifier prioritized intra SGSN routing area update is executed.

FIG. 12 shows an embodiment in which the intra SGSN routing area update used in a GPRS/GSM packet radio network is adapted to afford the mobile node a level of priority for handling a routing area updates in accordance with the service level identifier. In this example, when the routing area update request message is received by the SGSN 67, from the mobile node 65, the SGSN prioritises the routing area update in accordance with the service level identifier 69.

Inter SGSN Routing Area Update

Figure 13:
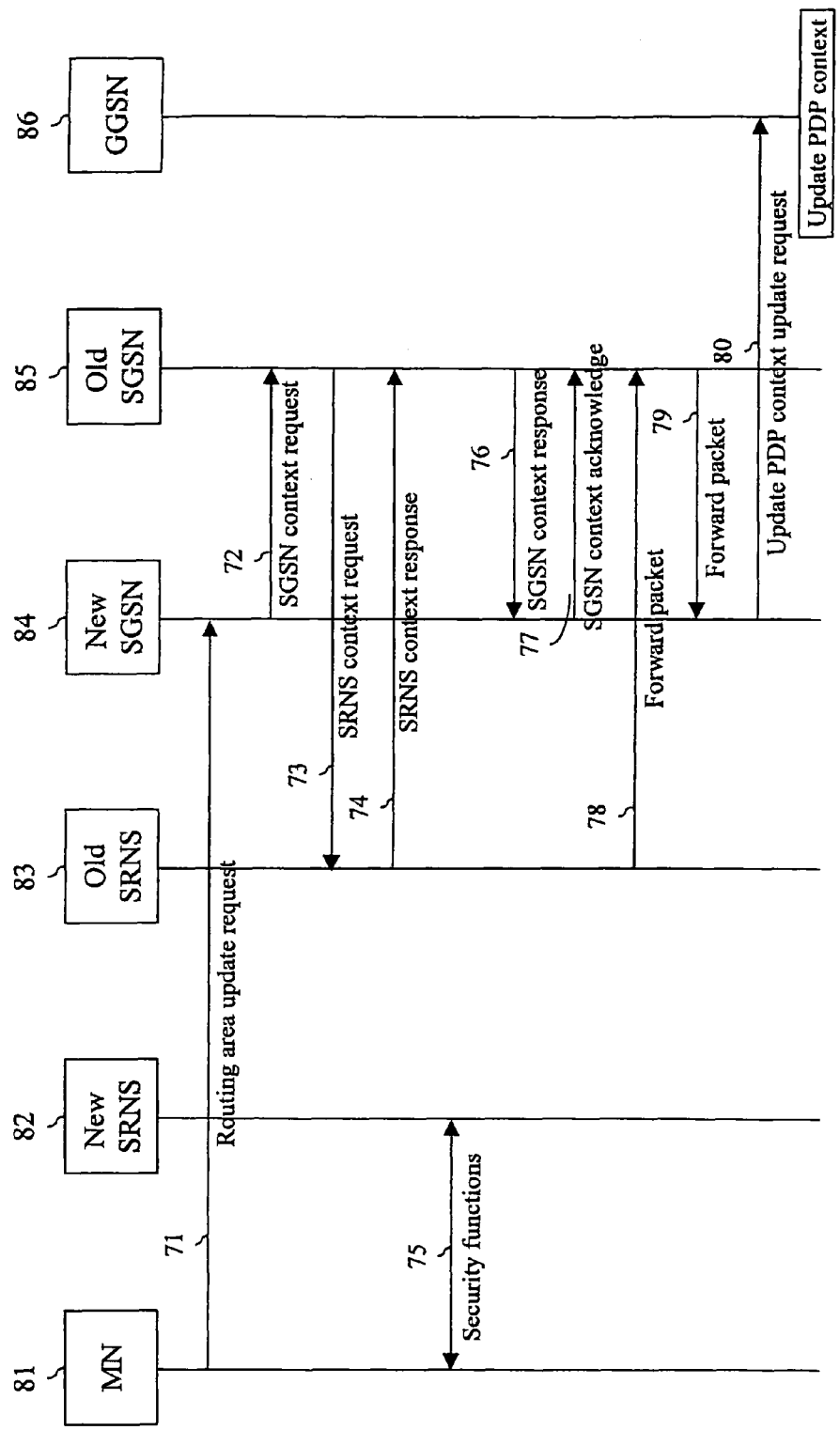
FIG. 13 provides a diagram showing the process by which an inter SGSN routing area update is executed.

FIG. 13 shows a simplified procedure for an inter SGSN routing area update used in a GPRS/UMTS packet radio network. This simplified procedure concerns the mechanism by which a PDP context is updated as part of a routing area update. New SRNS (serving radio network system) 82 and old SRSN mobile node 81 each comprise a Nobe B and RNC. The new SRNS 82 sends a routing area update request 71 to the new SGSN 84 which controls the routing area into which the mobile node has moved. New SGSN 84 sends a SGSN context request 72 to the old SGSN 85 (the SGSN controlling the routing area where the mobile node was previously attached). The SGSN context request 72 requests details of the PDP context for mobile node 81. Messages 73 and 74 are messages which the old SGSN 85 sends and receives from the old SRNS 83 to retrieve information regarding the mobile node's PDP context. The old SGSN 85 then sends SGSN context response message 76 to the new SGSN 84 detailing the mobile node's PDP context information. The new SGSN 84 sends a PDP context update request 80 to the GGSN 86. The GGSN 86 upon receipt of the PDP context request 80, updates the PDP context.

Figure 14:
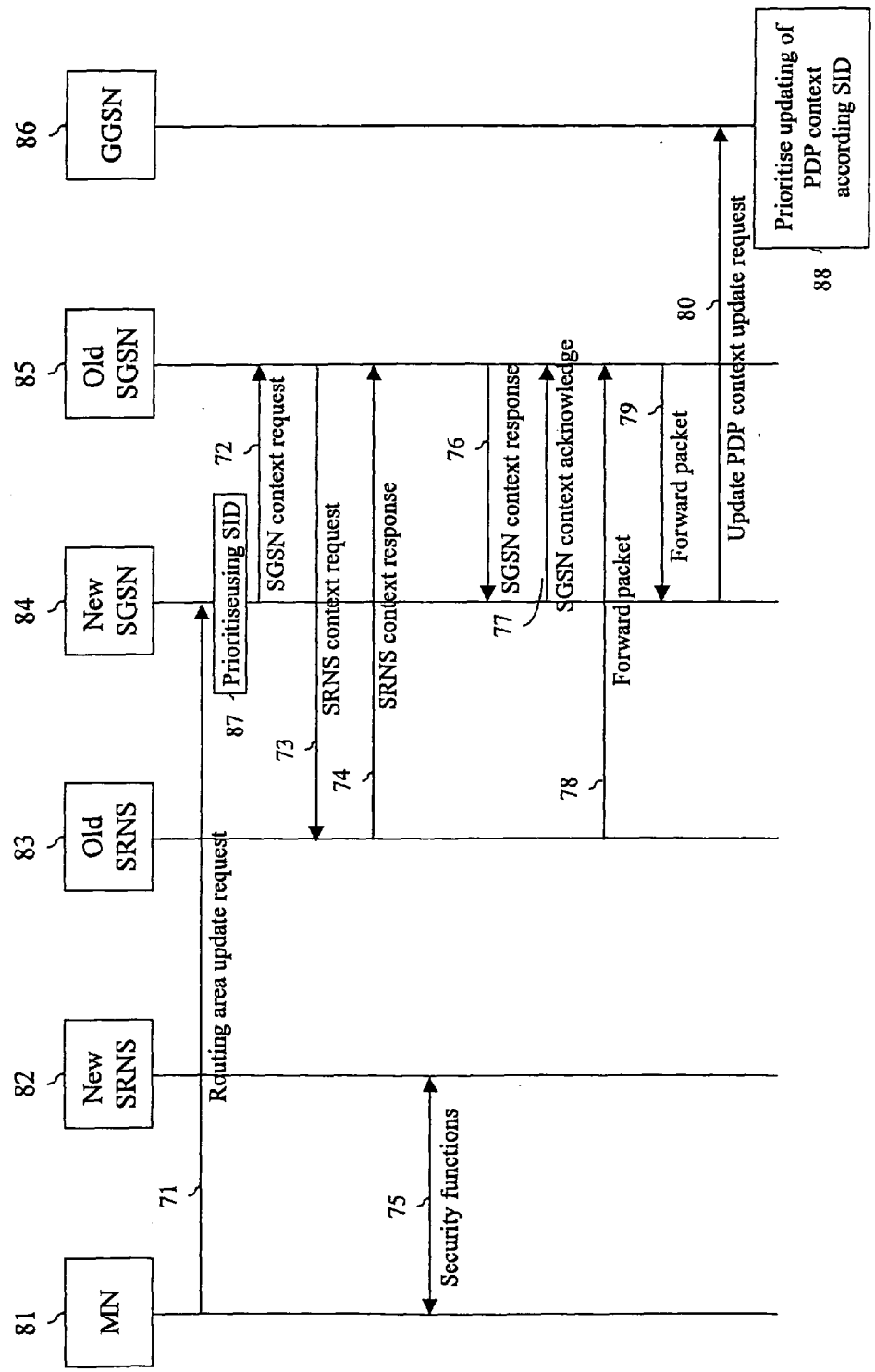
FIG. 14 provides a diagram showing the process by which a service level identifier prioritized inter SGSN routing area update is executed.

FIG. 14 shows an embodiment in which the intra SGSN routing area update used in a GPRS/GSM packet radio network is adapted to afford the mobile node a level of priority for handling a routing area update in accordance with the service level identifier. After the new SGSN 84 receives routing area update request 71 from mobile node 81, the new SGSN 84 is operable to process the routing area update request with a priority in accordance with a service level identifier associated with mobile node 81, stored in a service level identifier cache. When the GGSN 86 receives the update PDP context request message 80 from the new SGSN 84, the GGSN 86 is operable to process update the PDP context request message 80, with a priority in accordance with a service level identifier associated the with mobile node 81, stored in a service level identifier cache.

Figure 15:
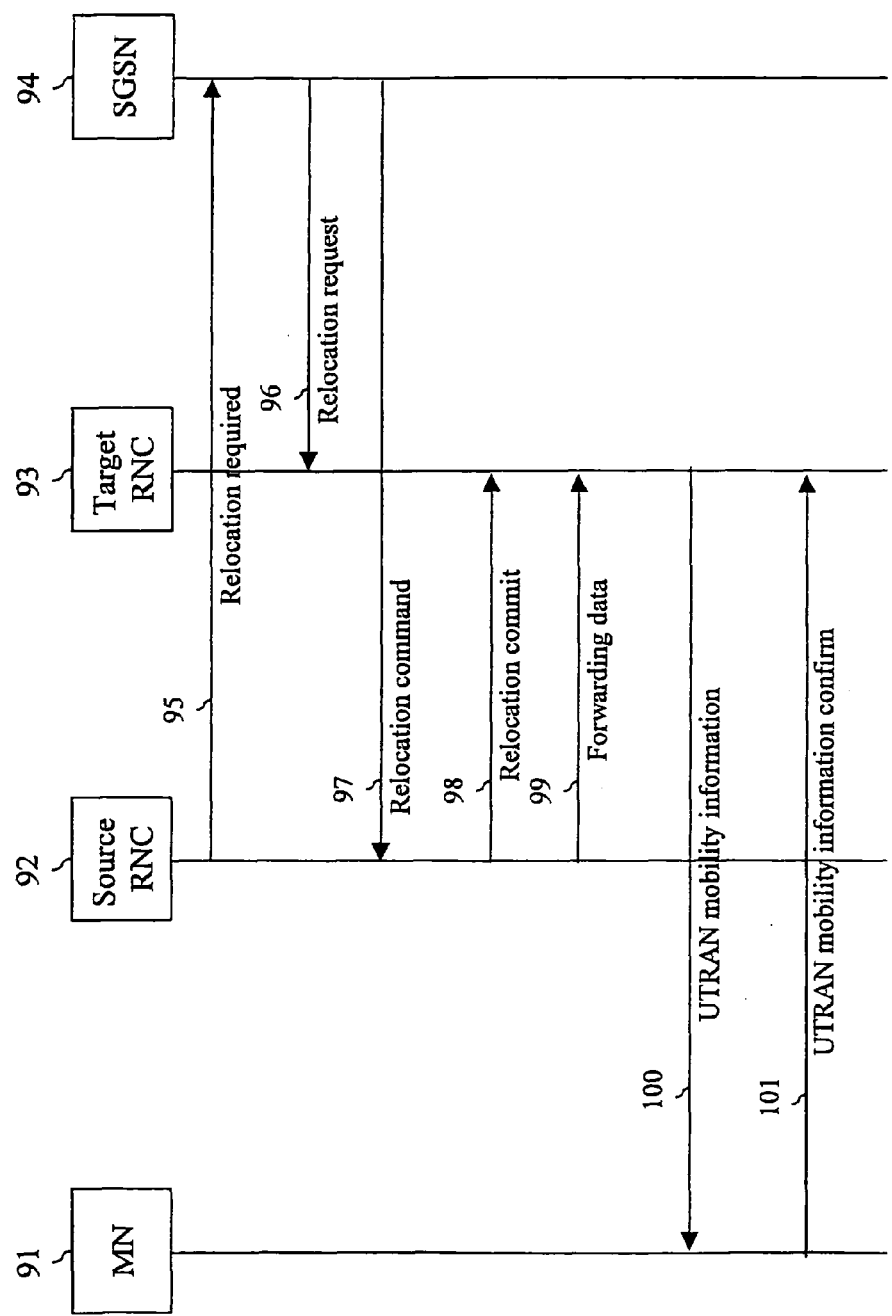
FIG. 15 provides a diagram showing the process by which an intra SGSN RNC hand over is performed.
Figure 16:
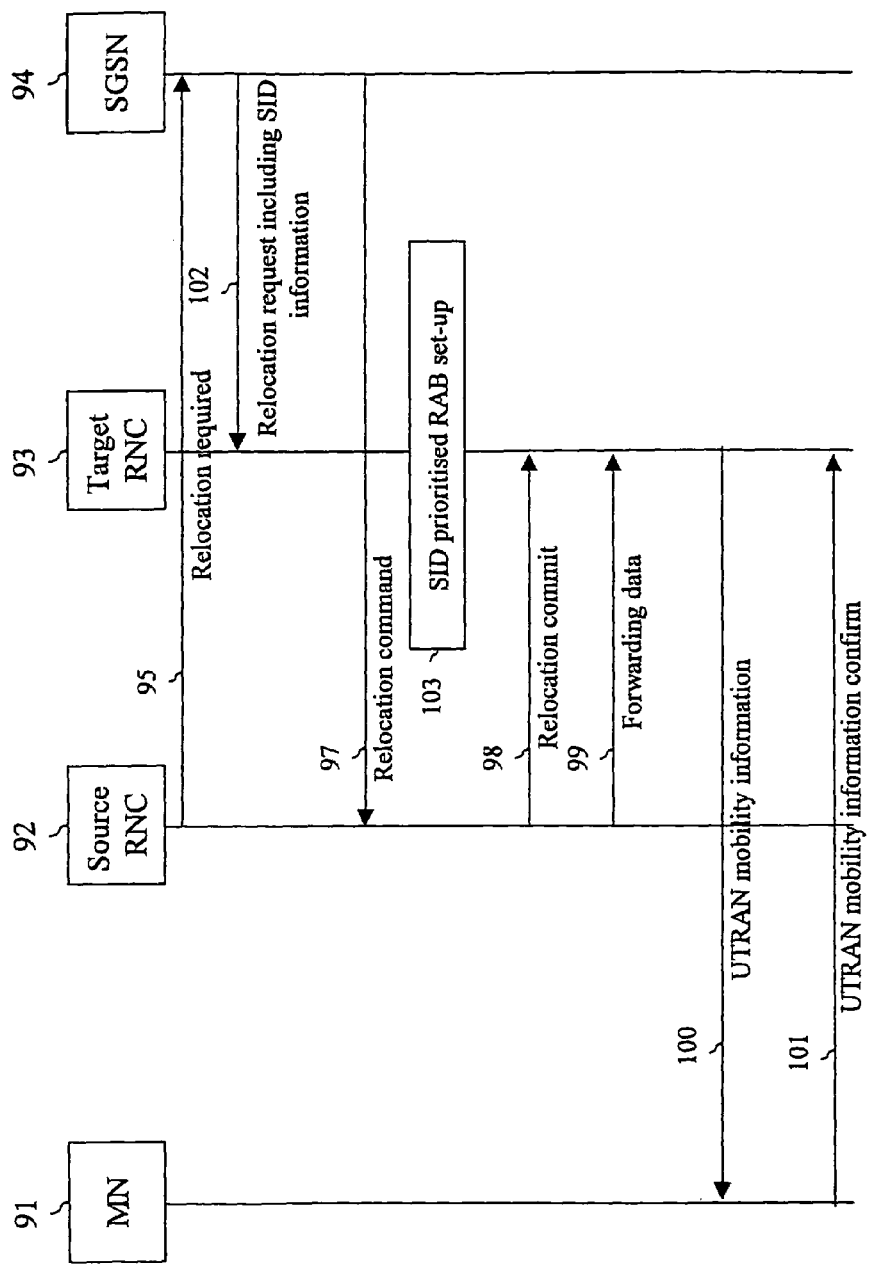
FIG. 16 provides a diagram showing the process by which a service level identifier prioritized intra SGSN RNC hand over is performed.

In one embodiment, the core network affords a mobile node a level of priority with which a hand over between radio network nodes is performed, in accordance with a service level identifier. FIG. 15 shows a simplified procedure for an intra SGSN hand over of a mobile node from one RNC to another RNC in a GPRS/UMTS packet radio network. When a decision has been reached to hand over the mobile node 91 from a source RNC 92 to a target RNC 93, the source RNC 92 sends relocation required message 95 to an SGSN 94. The SGSN 94 then sends a relocation request message 96 to the target RNC 93 and a relocation command 97 to the source RNC 92. The source RNC 92 then sends relocation commit message 98 to the target RNC 93. The source RNC 92 then forwards data 99 to the target RNC 93. This forwarded data includes data necessary for establishing a new radio bearer for mobile node 91. The target RNC 93 then sends UTRAN (UMTS terrestrial radio access network) mobility information 100 to the mobile node 91. The mobile node 91 confirms the UTRAN mobility information 100 by sending the target RNC 93 UTRAN mobility information confirm message 101. FIG. 16 shows an embodiment in which an infra SGSN hand over procedure of a mobile node from one RNC to another RNC in a GPRS/UMTS packet radio network is adapted to afford the mobile node a level of priority for handling a routing area updates in accordance with the service level identifier. When the SGSN 94 receives relocation required message 95 from the source RNC 92, the SGSN 94 is operable to include the service level identifier information in relocation message 102 sent to target RNC 93. Upon receipt of a relocation request 102, the target RNC 93 is operable to prioritize 103 further processing of the hand over procedures in accordance with a priority represented by the service level identifier information.

Various further aspects and features of the present invention are defined in the appended claims. Various modifications can be made to the embodiments herein described without departing from the scope of the present invention. For example it will be appreciated that although embodiments of the invention have been described with reference to GPRS/UMTS and GPRS/GSM, embodiments of the present invention find application with other packet radio systems and mobile radio details such as WiMAX and CDMA 2000. Furthermore, although the service level identifier has been conveyed within a PCO filed of a PDP context, it will be appreciated that in other examples the service level identifier may be conveyed in other fields or in other forms within a communication bearer establishment procedure.

The invention claimed is:

1. A telecommunications system operable to provide a facility for mobile communications to a mobile node, the system comprising a packet radio network comprising a core network and a radio network, the core network being arranged to communicate internet packets to and from the radio network in accordance with a location of the mobile node within the packet radio network, and the radio network being arranged to communicate the internet packets between the core network and the mobile node via a radio access interface, the core network and the radio network being arranged to communicate the internet packets in accordance with a current configuration of routing and communications resources of at least one of the core network and the radio network, established in accordance with the location of the mobile node, wherein the mobile node is arranged to generate a packet data context activation request in accordance with a packet context activation procedure for establishing a communications bearer for communicating the internet packets across the mobile radio network, the packet data context activation request comprising a QoS request and a service level identifier, the service level identifier representing a priority to be afforded to communicating internet packets to or from the mobile node with respect to the internet packets received from other mobile nodes, and to communicate the packet data context activation request to the core network of the packet radio network, wherein the core network is arranged to establish a communications bearer to and from the mobile node via the core network and the radio network in accordance with the packet data context activation request, and to alter the current configuration of routing and communications resources of at least one of the core network and the radio network following a change of location of the mobile node with a relative priority determined in accordance with the service level identifier.

2. A telecommunications system according to claim 1, wherein the routing configuration and communications resources includes providing the core network with a routing area, to which internet packets are routed to and received from so that the internet packets can be communicated to and received from the mobile node, and in response to a routing area update request received from the mobile node, the core network is arranged to process the routing area update request in accordance with the requested priority represented by the service level identifier.

3. A telecommunications system according to claim 2, wherein the core network comprises at least one serving packet radio system support node and a packet radio system gateway support node, and the routing area update request received from the mobile node includes an intra serving packet radio system support node routing area update.

4. A telecommunications system according to claim 2, wherein the core network comprises at least one serving packet radio system support node and a packet radio system gateway support node, and the routing area update request received from the mobile node includes an inter serving packet radio system support node routing area update.

5. A telecommunications system according to claim 1, wherein the routing configuration and communications resources are arranged to route the internet packets to and from the mobile node in accordance with an attachment of the mobile node to a first of a plurality of radio communications nodes in the radio network, and following a change of affiliation of the mobile node from the first radio communications nodes to a second of the radio communications nodes of the radio network, the core network is arranged to process a hand over procedure for the mobile node between the first radio communications node and the second radio communications node in accordance with the requested priority represented by the service level identifier.

6. A telecommunications system according to claim 1, wherein
the packet data context activation request is a packet data protocol activation request and the service level identifier is provided by a protocol configuration option part of the packet data protocol activation request.

7. A telecommunications system according to claim 1, wherein
the core network is operable to maintain a profile cache in which the service level identifier is stored in association with a packet data protocol address assigned to the mobile node.

8. A telecommunications system according to claim 7, wherein
the core network is operable to compare the requested priority represented by the service identifier to a pre-set priority associated with the packet data protocol address, and
if the requested priority does not exceed the pre-set priority to communicate the internet packets in accordance with the requested priority represented by the service level identifier.

9. A telecommunications system according to claim 1, wherein the packet radio network is a General Packet Radio System (GPRS).

10. A method of providing mobile communications to a mobile node using a packet radio network, the packet radio network including a core network and a radio network, the method comprising
communicating internet packets to and from the radio network of the packet radio network in accordance with a location of a mobile node within the packet radio network,
communicating the internet packets to and from the mobile node via a radio access interface, the internet packets received by the radio network or communicated to the radio network from and sent to the core network, then communicating the internet packets to and from the mobile node via the radio access interface, the radio network and the core network, being made in accordance with a current configuration of routing and communications resources of at least one of the core network and the radio network established in accordance with the location of the mobile node, wherein the current configuration of routing and communications resources are established in accordance with a location of the mobile including
generating a packet data context activation request using the mobile node in accordance with a packet connection procedure for establishing a communications bearer for communicating the internet packets across the mobile radio network,
altering the packet data context activation request to include a service level identifier representing a priority to be afforded to the communicated internet packets with respect to the internet packets received from other mobile nodes, and
communicating the packet data context activation request to the core network of the packet radio network,
establishing a communications bearer to and from the mobile node via the core network part and the radio network part in accordance with the packet data context activation request, and
altering the current configuration of routing and communications resources of at least one of the core network and the radio network following a change of location of the mobile node with a relative priority determined in accordance with the service level identifier.

11. A method according to claim 10, wherein the routing configuration and communications resources include providing the core network with a routing area, to which internet packets are routed to and received from so that the internet packets can be communicated to and received from the mobile node, the method comprising
in response to a routing area update request received from the mobile node, processing the routing area update request, in the core network, in accordance with the requested priority represented by the service level identifier.

12. A method according to claim 11, wherein the core network comprises at least one serving packet radio system support node and a packet radio system gateway support node, and the routing area update request received from the mobile node includes an intra serving packet radio system support node routing area update.

13. A method according to claim 11, wherein the core network comprises at least one serving packet radio system support node and a packet radio system gateway support node, and the routing area update request received from the mobile node includes an inter serving packet radio system support node routing area update.

14. A method according to claim 10, wherein the routing configuration and communications resources are determined to communicate internet packets to and from the mobile node in accordance with an attachment of the mobile node to a first of a plurality of radio communications nodes in the radio network, the method comprising
following a change of affiliation of the mobile node from the first radio communications nodes to a second of the radio communications nodes of the radio network, processing a hand over procedure in the core network for the mobile node between the first radio communications node and the second radio communications node in accordance with the requested priority represented by the service level identifier.

15. A method according to claim 10, wherein
the packet data context activation request is a packet data protocol activation request and the service level identifier is provided by a protocol configuration option part of the packet data protocol activation request.

16. A method according to claim 10, including
maintaining a profile cache in which the service level identifier is stored by the core network in association with a packet data protocol address assigned to the mobile node.

17. A method according to claim 16, including
comparing the requested priority represented by the service identifier to a pre-set priority associated with the packet data protocol address, and
if the requested priority does not exceed the pre-set priority, communicating the internet packets in accordance with the requested priority represented by the service level identifier.

18. A mobile node operable to provide a facility for mobile communications by communicating internet packets to and from a packet radio network, the packet radio network including a core network and a radio network, the mobile node being operable
to communicate internet packets to and from the radio network of the packet radio network, via a radio access interface, the radio network being arranged to communicate the internet packets received from and sent to the core network to and from the mobile node via the radio access interface, the core network and the radio network being arranged to communicate the internet packets in accordance with a current configuration of routing and communications resources of at least one of the core network and the radio network, established in accordance with the location of the mobile node,
in accordance with a packet connection procedure for establishing a communications bearer for communicating the internet packets across the mobile radio network, to generate a packet data connection activation request, the packet data connection activation request comprising a QoS request and a service level identifier, the service level identifier representing a priority to be afforded to communicating internet packets received by and transmitted from the mobile node with respect to the internet packets communicated by other mobile nodes, and
to communicate the packet data connection request to the core network of the packet radio network.

19. A method of communicating internet packets using a mobile node using a packet radio network, the packet radio network including a core network and a radio network, the method comprising
communicating the internet packets to and from the radio network of the packet radio network, via a radio access interface, the radio network being arranged to communicate the internet packets received from and sent to the core network to and from the mobile node via the radio access interface, the core network and the radio network being arranged to communicate the internet packets in accordance with a current configuration of routing and communications resources of at least one of the core network and the radio network, established in accordance with the location of the mobile node,
in accordance with a packet connection procedure for establishing a communications bearer for communicating the internet packets across the mobile radio network, generating a packet data connection activation request, the packet data connection activation request comprising a QoS request and a service level identifier, the service level identifier representing a priority to be afforded to communicating internet packets received by and transmitted from the mobile node with respect to the internet packets communicated by other mobile nodes, and
communicating the packet data connection request to the core network of the packet radio network.

20. A method of providing mobile communications to a mobile node using a packet radio network, the packet radio network including a core network and a radio network, the method comprising
communicating internet packets to and from the radio network of the packet radio network in accordance with a location of a mobile node within the packet radio network,
communicating the internet packets received by the radio network or communicated to the radio network, from and sent to the core network, to and from the mobile node via a radio access interface, the communicating the internet packets to and from the mobile node via the radio access interface, the radio network and the core network, being made in accordance with a current configuration of routing and communications resources of at least one of the core network and the radio network established in accordance with the location of the mobile node,
receiving a packet data connection activation request from the mobile node in accordance with a packet connection procedure for establishing a communications bearer for communicating the internet packets across the mobile radio network, the packet data connection activation request comprising a QoS request and a service level identifier, the service level identifier representing a priority to be afforded to the communicated internet packets with respect to the internet packets received from other mobile nodes,
establishing a communications bearer to and from the mobile node via the core network part and the radio network part in accordance with the packet data connection request, and
altering the current configuration of routing and communications resources of at least one of the core network and the radio network following a change of location of the mobile node with a relative priority determined in accordance with the service level identifier.

21. An apparatus for communicating internet packets using a mobile node using a packet radio network, the packet radio network including a core network and a radio network, the apparatus comprising
means for communicating the internet packets to and from the radio network of the packet radio network, via a radio access interface, the radio network being arranged to communicate the internet packets received from and sent to the core network to and from the mobile node via the radio access interface, the core network and the radio network being arranged to communicate the internet packets in accordance with a current configuration of routing and communications resources of at least one of the core network and the radio network, established in accordance with the location of the mobile node,
means for generating, in accordance with a packet connection procedure for establishing a communications bearer for communicating the internet packets across the mobile radio network, a packet data connection activation request, the packet data connection activation request comprising a QoS request and a service level identifier, the service level identifier representing a priority to be afforded to communicating internet packets received by and transmitted from the mobile node with respect to the internet packets communicated by other mobile nodes, and means for communicating the packet data connection request to the core network of the packet radio network.

22. An apparatus for providing mobile communications to a mobile node using a packet radio network, the packet radio network including a core network and a radio network, the apparatus comprising means for communicating internet packets to and from the radio network of the packet radio network in accordance with a location of a mobile node within the packet radio network, means for communicating the internet packets received by the radio network or communicated to the radio network, from and sent to the core network, to and from the mobile node via a radio access interface, the means for communicating the internet packets to and from the mobile node via the radio access interface, the radio network and the core network, being arranged in accordance with a current configuration of routing and communications resources of at least one of the core network and the radio network established in accordance with the location of the mobile node, means for receiving a packet data connection activation request from the mobile node in accordance with a packet connection procedure for establishing a communications bearer for communicating the internet packets across the mobile radio network, the packet data connection activation request comprising a QoS request and a service level identifier, the service level identifier representing a priority to be afforded to the communicated internet packets with respect to the internet packets received from other mobile nodes, means for establishing a communications bearer to and from the mobile node via the core network part and the radio network part in accordance with the packet data connection request, and means for altering the current configuration of routing and communications resources of at least one of the core network and the radio network following a change of location of the mobile node with a relative priority determined in accordance with the service level identifier.

* * * * *